March 29, 1960     E. E. SCHNELL     2,930,336
AUTOMATIC SLIDE CONTROL FOR GRAIN DRILLS
Filed May 23, 1957
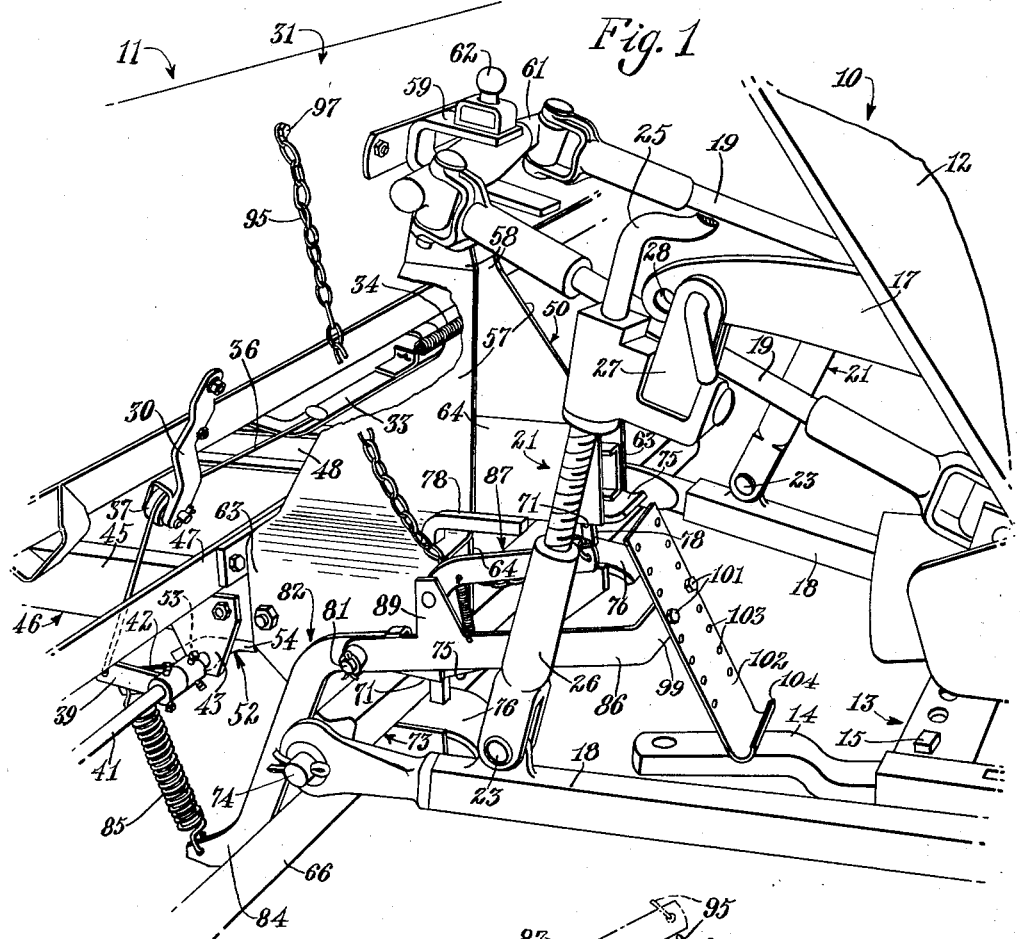
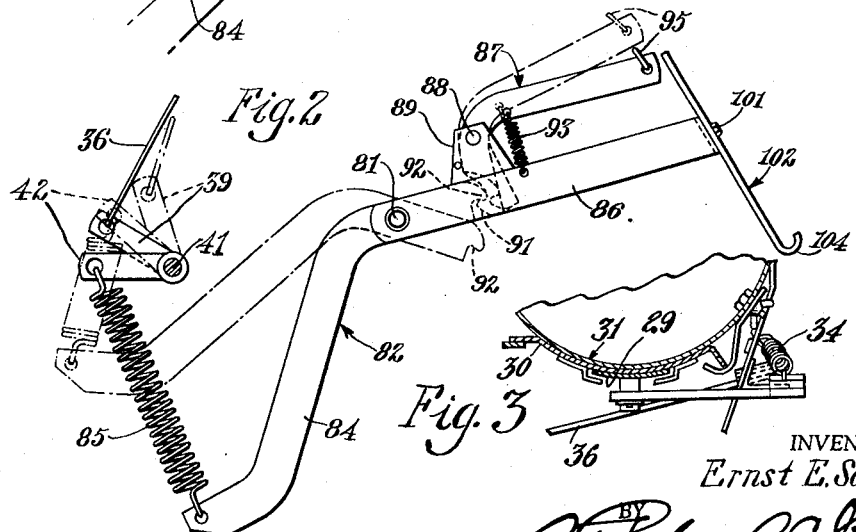
INVENTOR.
Ernst E. Schnell
Attorney

United States Patent Office 2,930,336
Patented Mar. 29, 1960

2,930,336

AUTOMATIC SLIDE CONTROL FOR GRAIN DRILLS

Ernst E. Schnell, West Bend, Wis., assignor, by mesne assignments, to Deere & Company, a corporation of Delaware Application May 23, 1957, Serial No. 661,103

9 Claims. (Cl. 111—67)

The present invention relates generally to agricultural implements and more particularly to implements of the type that are adapted to be carried on the hitch links of a farm tractor having means by which the hitch links may be raised and lowered by power for the purpose of raising and lowering the implements, as into and out of transport and working positions.

The object and general nature of this invention is the provision of new and improved means for automatically shifting an operating part of the implement from one position to another when the implement is raised or lowered relative to the tractor. More specifically, it is a feature of this invention to provide an implement such as a grain drill with fertilizer distributing means and to control the flow thereof by means including a shut-off slide that is spring biased so as to be automatically moved to a closed position but which may be opened when the implement is lowered into operating position by means that automatically shifts the slide against the action of the spring biasing means in response to the lowering movement of the implement relative to the tractor.

These and other objects and advantages of this invention will be apparent to those skilled in the art after a consideration of the following detailed description of the preferred embodiment, taken in conjunction with the accompanying drawings in which the preferred embodiment has been shown by way of illustration.

In the accompanying drawings:

Fig. 1 is a fragmentary perspective view showing a rear portion of a propelling and supporting tractor, the forward portion of an associated grain drill supported on the tractor, with associated hitch linkage and slid-controlling means in which the principles of this invention have been incorporated.

Fig. 2 is a fragmentary detail view showing the action of the release mechanism associated with the articulated lever by means of which lowering movement of the implement relative to the tractor is made effective for controlling the fertilizer distributing slide.

Fig. 3 is a fragmentary sectional view taken generally along the line 3—3 of Fig. 1.

Referring first to Fig. 1, the tractor is indicated in its entirety by the reference numeral 10 and the implement, which is shown as a grain drill, is represented in its entirety by the reference numeral 11. Only the rear portion of the tractor is shown, which includes the right hand rear wheel fender 12, a tractor drawbar support 13 and a laterally swingable drawbar 14, the latter being held in a position to one side of the tractor center line by any suitable means, such as a bolt 15. The tractor 10 also includes power lift means, represented by a power lift arm 17, there being one such arm at each side of the tractor and operated by power to raise and lower plurality of hitch links with which the tractor normally is equipped. As shown in Fig. 1, there are two lower hitch links 18, which preferably are universally connected with the tractor drawbar support 13, or some other portion of the tractor, and also the tractor is provided with a pair of upper links 19 that, taken together, constitute upper link means. Each arm 17 is connected with the associated lower link 18 by lift link means 21, the lower ends of which are pivoted, as at 23, to the associated lower hitch link. To provide lateral tilting adjustment for the associated implement, one of the links 21, such as the right hand link, may incorporate a crank screw 25 and associated internally threaded sleeve means 26 whereby the effective length of the link 21 may be varied, as desired. A swivel 27 connects the upper part of the adjusting mechanism to either of two optionally accessible openings 28 in the rear or outer end of the associated power lift arm 17.

The implement 11 is shown as a grain drill and includes a hopper 31 that is of generally conventional construction, preferably having two sections, one carrying grain and the other carrying fertilizer. As best shown in Fig. 3, the hopper 31 is provided with flow control means preferably in the form of a shut-off flow-controlling slide 29 mounted for movement on a bottom slide 30, both supported on the bottom of the hopper 31. The bottom slide 30 is adjustable to control the rate of flow from the fertilizer section of the hopper and the shut-off slide 29 is movably carried by the bottom slide 30 and is constructed and arranged to prevent flow of fertilizer from the hopper, irrespective of the position of the bottom or rate of flow controlling slide 30 whenever the drill is raised into a transport position. It may also be desirable to shut off the fertilizer flow, even though the drill is in its lowered or operating position, an instance being, for example, when filling the hoppers in which it is desirable to have the hoppers in their lowermost position. The shut-off slide 29 carries a yoke 33 which constitutes a part movably mounted on the frame of the grain drill and is disposed at the front of the grain drill, as shown in Fig. 1, the yoke 33 being fixed directly to the shut-off slide 29. The latter is urged by a spring connectioin 34 to a closed position, terminating all fertilizer flow, and the shut-off slide 29 may be opened by pulling the yoke 33 against the action of the spring whenever it is desired to distribute the fertilizer. For example, one such slide actuating controlling means may be in the form of a cable 36 connected to the yoke 33, preferably at the end opposite the spring 34. As shown in Fig. 1, the cable 36 passes over a sheave 37 carried on the grain drill by a bracket 30. The lower end of the cable 36 is connected to an arm 39 on a transverse rockshaft 41. Fixed to the rockshaft 41 is a second arm 42, the latter being closely adjacent the bracket 43 that supports the rockshaft 41 from one of the fore-and-aft frame members 45 that forms a portion of the grain drill frame, which is indicated in its entirety by the reference numeral 46. The frame 46 also includes a transverse angle 47 and a left hand frame member 48. The frame members 45 and 48 preferably are in the form of channels, the forward ends of which extend forwardly into and serve to receive a mast structure 50 to which detailed reference will be made below. The rockshaft 41 carries, just inside the bracket 43, a stop member 52 in the form of a double armed lever having ends 53 and 54 that engage the underside of the associated channel 45 so as to limit rocking movement of the shaft 41. In the practice of the broader aspects of my invention the flow control means mentioned above represents any suitable operating means on an implement.

The mast structure 50 mentioned above is formed of a pair of generally upwardly converging plate sections 57, the upper end portions 58 being secured to and supporting an upper yoke 59 in which the cross bar 61, to which the rear ends of the upper links 19 are swivelly connected, is connected, as by a quick detachable pin 62 or other suitable means. The lower portion of the vertical hitch structure 50 is formed by laterally outwardly and downwardly extended sections 63 of the mast plate sections 57, these sections being re-enforced by plate sections 64 suitably welded or otherwise fixed in place. The forward ends of the frame channels 45 and 48 are received between the mast sections 63 and 64, being welded therein whereby the mast structure 50 forms an intgral part of the frame of the implement 11. The lower portions of the mast sections 63 extend downwardly and receive and support a transverse pipe section 66 to which the drag bars of the drill are connected.

The lower forward portions of the vertical mast structure 50 are cut back, as at 71, to provide notches in which a square hitch bar 73 is received. The ends of the bar 73 are reduced, as at 74, and these reduced ends pivotally receive the rear ends of the hitch links 18 of the tractor. Upper and lower flaring guide plates 75 and 76 are welded to each of the notched sections to form guide means facilitating the movement of the draft bar 73 into position in the notched portions 71. Pins 78, there being one at each side of the vertical mast structure 50, extend downwardly through suitable openings in the associated plates and are disposed in front of the draft bar 73 when the latter is in position. If desired, the draft bar 73 may be more or less permanently retained as a part of the grain drill 11 or, if desired, the draft bar 73 may be retained in connection with the rear ends of the draft links 18 so as to form, in effect, a part of the tractor.

A stud 81 is fixed to the right hand mast plate section 63 and supports a shiftably mounted part in the form of a slide controlling lever that is indicated in its entirety by the reference numeral 82. The lever 82 is pivotally mounted on the stud 81 and has a rearwardly and downwardly extending section 84 connected by a relatively heavy spring 85 to the arm 42 on the rockshaft 41. The forward section of the lever 82 is indicated at 86, this section also being pivoted on the stud 81 and normally locked to the other lever section 84 by means of a detent lever 87 that is pivotally mounted, as at 88, on a bracket 89 that is carried by and forms a part of the forward lever section 86. The lower end portion 91 of the lever 87 is formed as a hook and engages underneath a companion hook section 92 that is formed on the forward portion of the rear lever section 82, as best shown in Fig. 2. A spring 93 is connected between the lever part 86 and the detent or locking lever 87 so as to urge the latter into locking position. An operating chain 95 is connected to the forward end of the latch lever 87 and at its upper end, as at 97, to the forward wall of the hopper 31.

The forwardmost end of the forward lever section 86 is turned laterally, as at 99, and is apertured to receive a pair of bolts 101 that secure an actuating plate 102 in different position of vertical adjustment relative to the lever section 86. To this end, the actuating plate 102 is provided with a plurality of apertures 103. The lower end of the actuating plate 102 is turned upwardly to form a curved portion indicated at 104. This portion is adapted to contact the drawbar 14 of the tractor when the drawbar is held in a right hand position, as shown in Fig. 1.

The operation of the implement described above is substantially as follows.

The implement 11 is shown in Fig. 1 in a lowered or operating position. When the tractor power lift mechanism is actuated in order to raise the drill into a transport position, the lift arms 17 are swung upwardly and act through the lift links 21 to raise the rear ends of the draft links 18. This acts through the draft bar 73 and associated mast structure 50 of the implement to raise the latter into a transport position. The latch lever 87 is shown in a locked position in Fig. 1 and therefore when the implement is raised the contact or actuating plate 102 lowers relative to the implement frame and thus relaxes the tension in the spring 85. When this occurs, the slide actuating spring 34 moves the slide yoke 33, and the associated shut-off slide 29, to the right as viewed in Fig. 1, which closes the shut-off slide 29 and prevents any flow of fertilizer from the hopper 31.

When the implement 11 is to be lowered into an operating position, the tractor power lift arms 17 are permitted to swing downwardly, and as the implement 11 lowers, the plate 102 engages the tractor drawbar 14. This causes the lever 82 to be swung in a counterclockwise direction as viewed in Figs. 1 and 2, which exerts tension through the spring 85 and rocks the rockshaft 41 in a counterclockwise direction, as viewed in Fig. 2. This exerts a pull through the cable 36 against the yoke 33, and since the spring 85 is stronger than the spring 34, the latter yields, and the yoke 33, together with the associated shut-off slide 29, is moved to an open position, permitting the fertilizer to flow from the hopper 31. The flow of fertilizer may be shut off at any time, even though the implement is in a lowered position, merely by the operator grasping the chain 95 and pulling upwardly on the detent or latch lever 87 until the hook portions 91 and 92 are disengaged. Tension is then no longer exerted through the spring 85, and the slide spring 34 then immediately closes the shut-off slide 29. To reengage the latch lever 87 it is necessary for the operator to release the chain 95 and then raise the implement until the latch reengages.

In normal operation, raising the implement to a transport position permits the spring 34 to move the shut-off slide to a closed position, and lowering the implement will cause the plate 102 to engage the tractor drawbar and thus swing the lever 82 into a position pulling the shut-off slide into an open position. The principal purpose of the latch 87 and associated parts is to permit the operator to shut off the flow of fertilizer while the implement is in a lowered or operating position so as to prevent loss of fertilizer when the grain drill is idle or when the hoppers are being filled. It is preferable to have the grain drill in its lowermost position when filling the hoppers, for in that position the hoppers are much lower than they are when the drill is in its raised or transport position. Also, by raising the latch lever 87, the forward lever portion 86 may be swung manually back into an idle position against the forward wall of the hopper. This disposes the contact plate 102 in a position substantially above the lower portion of the mast structure and places the plate 102 and other parts in such position that they do not interfere with the passage of the square bar and other tractor part into position when hitching the tractor up to the grain drill 11.

While I have shown and described above the preferred structure in which the principles of the present invention have been incorporated, it is to be understood that the present invention is not to be limited to the particular details, shown and described above, but that, in fact, widely different means may be employed in the practice of the broader aspects of this invention.

What I claim, therefore, and desire to secure by Letters Patent is:

1. An agricultural implement connected to a tractor having a plurality of upper and lower hitch links, power lift means connected with certain of said links, and a generally centrally disposed drawbar, said implement including frame means having vertical mast means to which the rear ends of said upper and lower hitch links are connected, distributing means carried by said frame means, flow control means for said distributing means including a movably mounted part carried by said frame means, a lever pivotally mounted on said mast means, means connecting one end of said lever with said movably mounted part to shift the latter in one direction, means at the other end of said lever positioned to be engaged and actuated by said tractor drawbar when the implement is lowered relative to the tractor, and means connected at one end with said frame means and at the other end with the movably mounted part for shifting the latter in the other direction when the implement is raised relative to the tractor.

2. An integral fertilizer grain drill carried on a tractor having upper and lower hitch links, power lift means connected with the lower links, and a drawbar, said drill comprising frame means detachably receiving said hitch links, a lever pivotally mounted on said frame means in a generally fore-and-aft extending position and adapted at its forward end to be engaged by the tractor drawbar when the grain drill is lowered into operating position by said power lift means, spring means connected at one end to the operating means and at the other end to the frame means for shifting the operating means to one position, the operating means being moved to a second position when the forward end of the lever is engaged and moved by the tractor drawbar, and said spring means serving to shift said operating means back to said one position when the grain drill is raised relative to the tractor and operating means on the grain drill connected to be controlled by movement of the other end of said lever.

3. An agricultural implement connected to a tractor having generally vertically shiftable hitch means, power lift means connected with said hitch means to raise and lower the same, and a drawbar adapted to be swung into a position at one side of the center line of the tractor, said implement comprising a generally transverse frame, a generally vertical mast structure carried by said frame and including means receiving said hitch means, a lever pivoted to one side of said mast structure and having an end extending generally rearwardly of said mast structure and an end extending generally forwardly of said mast structure, means on the forward end of said lever to engage the tractor drawbar when it lies in a position at one side of the tractor center line, movable implement operating means on said frame, means connecting the rear end of said lever with said operating means whereby movement of said lever in one direction serves to shift said operating means from one position to another, and spring means connected at one end with said frame and at the other end with said operating means for shifting the latter back to said one position when the lever is moved in the other direction.

4. An agricultural implement connected to a tractor having generally vertically movable hitch means and power lift means connected with said hitch means to raise and lower the same, said implement comprising a generally transverse frame, means on said frame to receive said hitch means whereby operation of said power lift serves to raise and lower the implement, a movably mounted part on said frame, spring means connected with said frame and said movably mounted part and acting to shift said part in one direction, a lever pivoted on said frame and having one portion extending forwardly toward the tractor and another portion extending generally rearwardly, means connecting the rear portion of said lever with said movably mounted part, means on the forwardly extending portion of the lever adapted to contact the tractor when said power lift lowers the implement and thereby causing said lever to shift said movably mounted part against the action of said spring means into one of two optional positions, said portions of said lever being movable one with respect to the other, and releasable latch means locking said portions against relative movement, release of said latch means serving, when the implement is lowered, to disconnect said lever portions and permit said spring means to move said movably mounted part into the other of said two positions.

5. An agricultural implement connected to a tractor having generally vertically movable hitch means and power lift means connected with said hitch means to raise and lower the same, said implement comprising frame means, a part movably mounted thereon and shiftable from one position to another, spring means connected between said frame means and said part for urging said part to move toward one position, a two part articulated lever pivotally mounted on said frame means, releasable latch means carried by one of said lever parts and engageable with the other lever part for releasably locking the two parts of said lever together, means connecting one end portion of said lever with said shiftable part, means connected with the other portion of said lever and shiftable from a first position to a second position to move said lever in a direction to shift said part into its said other position, movement of said lever in one direction acting to move said shiftable part toward said other position against the action of said spring means, and means connected to release said latch means so as to disconnect lever parts and permit said shiftable part to be returned to said one position by said spring means while said lever moving means remains in said second position.

6. An agricultural implement carried on and raised and lowered relative to a supporting tractor having vertically movable hitch means connecting the implement with the tractor and lift means connected with the hitch means to raise and lower the latter, said implement comprising frame means, a part movably mounted thereon from one position to another, spring means connected with said movably mounted part and said frame means for urging said part to move toward one position, a two part articulated lever pivotally mounted on said frame means, releasable latch means locking the two parts of said lever together, means connecting one end portion of said lever with said movably mounted part, means on the other end portion of said lever positioned to engage and be moved toward a first position by a part of the tractor when the implement is lowered relative to the latter, the aforesaid movement of said lever acting to move said movably mounted part toward said other position, and means connected to release said lever parts so as to permit said movably mounted part to be returned by said spring means to said one position by said spring means while said other end portion of said lever remains in said one position.

7. A grain drill connected to a tractor having power lift means and hitch link means connected to be raised and lowered by said power lift, said grain drill comprising frame means, a hopper carried thereby, flow control means movably carried at the under side of said hopper, spring means connected between said frame means and said flow control means and biasing said control means to move to a closed position, an articulated lever pivotally carried by said frame means and having one portion connected to shift said flow control means to an open position, said articulated lever including a second portion movable relative to said one portion, and releasable latch means interlocking said lever portions to cause them to move together, and means on said other lever portion disposed to engage an adjacent part of the tractor when the drill is lowered relative thereto so as to cause said lever to pivot on said frame means and shift said flow control means to an open position, and said latch means being releasable so as to permit said spring means to close said flow control means when the drill is lowered, thereby accommodating filling the hopper while it is lowered but without loss of material from the hopper.

8. A grain drill connected to a tractor having power lift means and hitch link means connected to be raised and lowered by said power lift, said grain drill comprising frame means, generally vertical mast means at the front of said frame means to receive the hitch link means of the tractor, a hopper carried by said frame means, flow control means movably carried at the underside of said hopper, spring means connected between said frame means and said flow control means and biasing said control means to move to a closed position, an articulated lever pivotally carried by said frame means and having one portion connected to shift said flow control means to an open position, said articulated lever including a second portion movable relative to said one portion, and releasable latch means interlocking said lever portions to cause them to move together, and means on said other lever portion disposed to engage an adjacent part of the tractor when the drill is lowered relative thereto so as to cause said lever to pivot on said frame means and shift said flow control means to an open position, and said latch means being releasable so as to permit said spring means to close said flow control means when the drill is lowered, said second portion of said articulated lever, when said latch means has been released, being swingable into an over-center position back against the adjacent side of the hopper so as to provide clearance for tractor parts when the tractor is backed into hitching position relative to the grain drill.

9. An agricultural implement connected to a tractor having upper and lower hitch links, power lift means connected to raise and lower said hitch links, and a drawbar adapted to be swung into a position at one side of the center line of the tractor, said implement comprising a generally transverse frame, a hopper carried thereby, a flow controlling slide on the lower portion of the hopper, a generally vertical mast structure carried by said frame and including means receiving the upper and lower hitch links, a lever pivoted to one side of said mast structure and having an end extending generally rearwardly of said mast structure and an end extending generally forwardly of said mast structure, means on the forward end of said lever to engage the tractor drawbar when it lies in a position at one side of the tractor center line, means connecting the rear end of said lever with said slide whereby movement of said lever in one direction serves to shift said slide from one position to another, and spring means connected at one end with said frame and at the other end with said slide for shifting the latter back to said one position when the lever is moved in the other direction.

References Cited in the file of this patent

UNITED STATES PATENTS

| | | |
|---|---|---|
| 1,041,000 | Beltzer | Oct. 12, 1912 |
| 2,410,937 | Harder | Nov. 12, 1946 |
| 2,622,715 | Probst | Dec. 23, 1952 |
| 2,687,307 | Austermiller | Aug. 24, 1954 |
| 2,854,172 | Buhr et al. | Sept. 30, 1958 |

UNITED STATES PATENT OFFICE

CERTIFICATE OF CORRECTION

Patent No. 2,930,336                                    March 29, 1960

Ernst E. Schnell

It is hereby certified that error appears in the printed specification of the above numbered patent requiring correction and that the said Letters Patent should read as corrected below.

Column 5, line 16 to 26, should read as shown below instead of as in the patent:

> position by said power lift means, operating
> means on the grain drill connected to be con-
> trolled by movement of the other end of said
> lever, spring means connected at one end to
> the operating means and at the other end to
> the frame means for shifting the operating
> means to one position, the operating means
> being moved to a second position when the
> forward end of the lever is engaged and moved
> by the tractor drawbar, and said spring means
> serving to shift said operating means back to
> said one position when the grain drill is
> raised relative to the tractor.

Signed and sealed this 27th day of September 1960.

(SEAL)
Attest:

KARL H. AXLINE                                ROBERT C. WATSON
Attesting Officer                           Commissioner of Patents